વ
3,128,296
ORGANIC PHOSPHINYLOXYALUMINUM COMPOUNDS AND THE PREPARATION THEREOF

William K. Johnson, Dayton, Ohio, assignor to Monsanto Chemical Company, St. Louis, Mo., a corporation of Delaware
No Drawing. Filed Oct. 3, 1960, Ser. No. 59,846
6 Claims. (Cl. 260—448)

The invention relates to new and useful compounds which can be prepared by the reaction of an organic phosphate with a trialkylaluminum compound.

The new compounds of the invention are especially useful as a component in making Ziegler-type polymerization catalysts. The new compounds are of the formula $$(RO)_2\overset{O}{\underset{\|}{P}}-O-AlR^1{}_2$$

each R is a hydrocarbon radical preferably free of non-benzenoid unsaturation and preferably having not more than about 20 carbon atoms. Non-benzenoid unsaturation is olefinic or acetylenic unsaturation in aliphatic or cycloaliphatic compounds. $R^1$ is an alkyl radical preferably having not more than 20 carbon atoms. The new compounds of the invention are made by reacting at elevated temperatures trialkylaluminum compounds with organic phosphates. The trialkylaluminum compound reactants are of the formula $AlR^1{}_3$ with the $R^1$'s being alkyl radicals preferably having not more than 20 carbon atoms and at least one of which is an alkyl radical having at least 2 carbon atoms. The $R^1$'s of the trialkylaluminum compound can be the same or different alkyl radicals. Also, if desired, mixtures of trialkylaluminum compounds can be used resulting in a mixture of products of the invention. Especially desirable reactants are the lower alkyl aluminum compounds. Lower is defined as not more than 6 carbon atoms. The phosphate reactant is of the formula $$(R^2O)_3\overset{O}{\underset{\|}{P}}$$

with the $R^2$'s being hydrocarbon radicals, preferably having not more than 20 carbon atoms, but at least one of which is an aliphatic, cycloaliphatic or araliphatic radical. The $R^2$'s can be the same or different hydrocarbon radicals and mixtures of these phosphates can be used in the method of the invention resulting in a mixture of compounds of the invention. Especially desirable reactants are the lower alkyl phosphates with lower being defined as described hereinabove. Normally, it is preferred to carry out the reaction in the range of about 60° C. to about 200° C. more preferably in the range of about 100° C. to about 175° C. for optimum yields. It is not necessary in the method of the invention to use an inert solvent for the reaction but under some conditions it may be desirable in which case inert aliphatic or aromatic solvents, such as toluene, octane, etc. can be used. For optimum yields of a desired product, normally it will be preferred to add the reactants in about equal molar amounts, however, under some conditions it may be desirable to add either reactant in excess of the stoichiometric amount.

It is an object of this invention to provide new and useful organic phosphorus and aluminum compounds especially useful as components in Ziegler-type polymerization catalyst.

It is another object of this invention to provide a new method for making the new compounds of the invention.

These and other objects of the invention will become apparent as the detailed description of the invention proceeds.

An illustrative list of the trialkylaluminum reactants of the invention not meant to be limiting of the invention is as follows: dimethylethylaluminum, triethylaluminum, triisopropylaluminum, diethyl-t-butylaluminum, tri-n-amylaluminum, tri-n-hexylaluminum, diethylisooctylaluminum, tri-n-decylaluminum, triisoheptadecylaluminum, ethyl-di-n-eicosylaluminum, etc. One suitable method for providing longer chain mixed aluminum alkyl reactants of the invention is described in Angewandte Chemie. 64, 323 (1952), by K. Ziegler.

An illustrative list of the phosphate reactants of the invention not meant to be limiting thereof is as follows: trimethyl phosphate, triethyl phosphate, diallyl ethyl phosphate, dimethyl ethyl phosphate, triisopropyl phosphate, tri-n-amyl phosphate, triisooctyl phosphate, diethyl n-dodecyl phosphate, triisoheptadecyl phosphate, tri-n-eicosyl phosphate, tricyclopentyl phosphate, tricyclohexyl phosphate, ethyl dicyclohexyl phosphate, diphenyl cyclohexyl phosphate, diphenyl ethyl phosphate, phenyl naphthyl cyclohexyl phosphate, phenyl naphthyl ethyl phosphate, tribenzyl phosphate, diphenyl benzyl phosphate, di-o-tolyl ethyl phosphate, ethyl di-3,4-xylyl phosphate, etc.

The following is a non-limiting listing of the new compounds of the invention:

(dimethoxyphosphinyloxy)-diethylaluminum,
(diethoxyphosphinyloxy)-dimethylaluminum,
(methoxyethoxyphosphinyloxy)-isopropyl-t-butyl-
  aluminum,
(diallyloxyphosphinyloxy)-di-n-amylaluminum,
(diisooctoxyphosphinyloxy)-diisooctylaluminum,
(di-n-dodecyloxyphosphinyloxy)-di-t-butylaluminum,
(di-n-heptadecyloxyphosphinyloxy)-diisotridecyl-
  aluminum,
(di-n-eicosyloxyphosphinyloxy)-di-n-eicosylaluminum,
(dicyclopentoxyphosphinyloxy)-diethylaluminum,
(diethoxyphosphinyloxy)-diisopropylaluminum,
(diphenoxyphosphinyloxy)-diisopropylaluminum,
(phenoxymethoxyphosphinyloxy)-diethylaluminum,
(phenoxybenzyloxyphosphinyloxy)-di-n-hexylaluminum,
(di-phenethyloxyphosphinyloxy)di-n-decylaluminum,
(di-o-tolyloxyphosphinyloxy)-diethylaluminum, etc.

The invention will be more clearly understood from the following detailed description of specific examples thereof:

Example 1

This example describes the preparation of (di-n-butoxyphosphinyloxy)-diethylaluminum. The equipment used in the run was a 500 ml. round bottom flask fitted with a dropping funnel, stirrer and reflux condenser (with air cooling). Before the run, the flask was flushed with nitrogen and was maintained under nitrogen blanketing during the run. A sample of 63 grams (0.235 mole) of tri-n-butyl phosphate was added to the reaction flask. Then over a period of about 20 minutes, 27 grams (0.235 mole) of triethylaluminum was added slowly to the stirred phosphate. A rather strong exothermic reaction was noted possibly due to complexing of the reactants. When the addition of the triethylaluminum was completed, an oil bath was used to heat the reaction mixture over a period of about 2 hours up to about 170° C. The reaction mixture was maintained at about 170° C. for about an additional four hours. At the end of the run, the reaction mixture was subjected to vacuum distillation at a pressure of about 13 mm. of Hg up to a pot temperature of 180° C. resulting in a distillate fraction of about 7 g. including material recovered in a Dry Ice trap. The distillation was then continued at a vacuum of from about 1 to 2 mm. of Hg, recovering fraction 2 of 5 g., B.P. 163–183° C., and fraction 3 of 50 g., B.P. 183–186° C. A residue of 7 g. of colorless liquid remained in the distillation pot. A sample of fraction 3 was submitted for elemental analysis and the results were as follows:

| Percent | Found | Calc'd for $C_{12}H_{28}O_4PAl$ |
|---|---|---|
| C | 49.1 | 49.0 |
| H | 9.7 | 9.6 |
| Al | 8.9 | 9.1 |

*Example 2*

This example describes the preparation of (diphenoxyphosphinyloxy)-di-n-octylaluminum. This experiment is carried out in a manner similar to the experiment of Example 1. The amounts of reactants used are 113.3 g. (⅓ mole) of diphenyl benzyl phosphate and 122 g. (⅓ mole) of tri-n-octylaluminum. The desired product is recovered in good yield.

*Example 3*

This example describes the making of (diphenoxyphosphinyloxy)-diisopropylaluminum. In a manner similar to that described in Example 1 the experiment of Example 3 is carried out. The reactants are 110.7 g. (⅓ mole) of diphenyl cyclohexyl phosphate and 53 g. (⅓ mole) of triisopropylaluminum. The desired product is recovered in good yield.

An alternative method of carrying out the reaction of the invention is to heat the phosphate reactant to the desired reaction temperature of about 150–175° C., then begin the addition of the trialkylaluminum compound cooling as necessary to maintain temperature.

*Example 4*

This example describes a making of a Ziegler-type catalyst using the product of Example 1 and the use of this catalyst for the polymerization of ethylene. A sample of 2.0 ml. of the product of Example 1 and 0.55 ml. of $TiCl_4$ in 100 ml. of isooctane were combined to form a Ziegler-type catalyst. To this catalyst was added an additional 400 ml. of isooctane. The reaction temperature was 65° C. Ethylene was then added and was adsorbed slowly. An additional 2.0 ml. of the product of Example 1 was added and the ethylene addition continued over a period of about ½ hour with the ethylene being added as fast as it was adsorbed. From the reaction mixture, 1.5 g. of solid polyethylene were recovered and 5–6 g. of liquid ethylene polymer were recovered.

Although the invention has been described in terms of specified embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. A method comprising reacting at elevated temperatures trialkylaluminum compounds of the formula $AlR^1_3$ wherein each $R^1$ is an alkyl radical having not more than 20 carbon atoms provided at least one $R^1$ is an alkyl radical having at least 2 carbon atoms with phosphates of the formula $(R^2O)_3P=O$ wherein each $R^2$ is a hydrocarbon radical free of non-benzenoid unsaturation and having not more than 20 carbon atoms, provided at least one of the $R^2$'s is selected from the class consisting of alkyl, cycloalkyl and aralkyl radicals, and separating the reaction product.

2. A method of claim 1 wherein $R^1$ and $R^2$ are lower alkyl radicals.

3. A method of claim 1 wherein said trialkylaluminum compound is triethylaluminum and said phosphate is tri-n-butyl phosphate.

4. Compounds of the formula

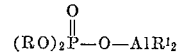

wherein each R is a hydrocarbon radical having not more than 20 carbon atoms and each $R^1$ is an alkyl radical free of non-benzenoid unsaturation and having not more than 20 carbon atoms.

5. Compounds of the formula

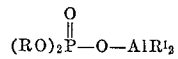

wherein each R and each $R^1$ is a lower alkyl radical.

6. (Di-n-butoxyphosphinyloxy)-diethylaluminum.

References Cited in the file of this patent

UNITED STATES PATENTS 2,288,288    Lincoln    June 30, 1942
2,922,738    McDermott    Jan. 26, 1960

OTHER REFERENCES

Van Wazer: Phosphorus and Its Compounds, vol. 1, pages 198–199, 1958.

UNITED STATES PATENT OFFICE
CERTIFICATE OF CORRECTION

Patent No. 3,128,296                      April 7, 1964

William K. Johnson

It is hereby certified that error appears in the above numbered patent requiring correction and that the said Letters Patent should read as corrected below.

Column 4, lines 31 and 32, strike out "free of non-benzenoid unsaturation and" and insert the same after "radical" in line 30, same column 4.

Signed and sealed this 8th day of December 1964.

(SEAL)
Attest:

ERNEST W. SWIDER
Attesting Officer

EDWARD J. BRENNER
Commissioner of Patents